United States Patent
Wright et al.

(10) Patent No.: US 10,974,496 B2
(45) Date of Patent: Apr. 13, 2021

(54) GENERATING A THREE-DIMENSIONAL OBJECT

(71) Applicant: Hewlett-Packard Development Company, L.P., Houston, TX (US)

(72) Inventors: Jacob Tyler Wright, San Diego, CA (US); Glenn Thomas Haddick, San Diego, CA (US); David H. Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 759 days.

(21) Appl. No.: 15/509,760

(22) PCT Filed: Sep. 30, 2014

(86) PCT No.: PCT/US2014/058380
§ 371 (c)(1),
(2) Date: Mar. 8, 2017

(87) PCT Pub. No.: WO2016/053312
PCT Pub. Date: Apr. 7, 2016

(65) Prior Publication Data
US 2017/0282456 A1     Oct. 5, 2017

(51) Int. Cl.
*B29C 67/00* (2017.01)
*B33Y 10/00* (2015.01)
*B33Y 50/02* (2015.01)
*B33Y 30/00* (2015.01)
*B29C 64/165* (2017.01)
(Continued)

(52) U.S. Cl.
CPC ............ *B33Y 50/02* (2014.12); *B29C 64/165* (2017.08); *B29C 70/882* (2013.01); *B33Y 10/00* (2014.12);
(Continued)

(58) Field of Classification Search
CPC .......... B33Y 50/02; B33Y 30/00; B33Y 10/00; B33Y 80/00; B33Y 70/00; B29C 70/882;
(Continued)

(56) References Cited

U.S. PATENT DOCUMENTS 8,070,473 B2    12/2011   Kozlak
2002/0105114 A1  8/2002   Kubo et al.
(Continued)

FOREIGN PATENT DOCUMENTS

CN      1950192 A       4/2007
JP     2002307562      10/2002
(Continued)

OTHER PUBLICATIONS

Bayless et al., "Wire Embedding 3D Printer", Apr. 12, 2010, Engineering Physics, University of British Columbia. http://www.reprap.org/mediawiki/images/2/25/SpoolHead_FinalReport.pdf.
(Continued)

*Primary Examiner* — Robert J Grun
(74) *Attorney, Agent, or Firm* — Mannava & Kang

(57) ABSTRACT

In an example, an apparatus for generating a three-dimensional object includes a build area platform, a build material distributor, a secondary material ejection device, a coalescing agent ejection device, and a controller. The controller may control the secondary material ejection device to eject a secondary material in a predefined pattern over the build area platform, control the build material distributor to distribute a layer of the build material around the ejected secondary material, control the coalescing agent ejection device to eject the coalescing agent onto the layer of the build material, and control an energy source to apply energy onto the ejected coalescing agent to cause the build material in contact with the ejected coalescing agent to coalesce and solidify.

14 Claims, 9 Drawing Sheets

(51) Int. Cl.
*B29C 70/88* (2006.01)
*B33Y 80/00* (2015.01)
*B33Y 70/00* (2020.01)
*B29K 71/00* (2006.01)
*B29K 77/00* (2006.01)
*B29K 505/04* (2006.01)
*B29K 505/06* (2006.01)

(52) U.S. Cl.
CPC .......... *B33Y 30/00* (2014.12); *B29K 2071/00* (2013.01); *B29K 2077/00* (2013.01); *B29K 2505/04* (2013.01); *B29K 2505/06* (2013.01); *B29K 2995/0005* (2013.01); *B33Y 70/00* (2014.12); *B33Y 80/00* (2014.12)

(58) Field of Classification Search
CPC .......... B29C 64/165; B29K 2995/0005; B29K 2505/06; B29K 2505/04; B29K 2077/00; B29K 2071/00
See application file for complete search history.

(56) References Cited

U.S. PATENT DOCUMENTS

| | | |
|---|---|---|
| 2002/0149137 A1 | 10/2002 | Jang et al. |
| 2007/0238056 A1 | 10/2007 | Baumann et al. |
| 2012/0219726 A1 | 8/2012 | Bayer et al. |
| 2013/0101803 A1 | 4/2013 | Grebe et al. |
| 2013/0127083 A1 | 5/2013 | Bobbitt |
| 2013/0224423 A1 | 8/2013 | Mikulak |
| 2014/0042657 A1 | 2/2014 | Mulliken |
| 2014/0268604 A1 | 9/2014 | Wicker et al. |

FOREIGN PATENT DOCUMENTS

| | | |
|---|---|---|
| JP | 2004358968 | 12/2004 |
| JP | 2005136007 | 5/2005 |
| JP | 2012106437 | 6/2012 |
| JP | 2015128884 | 7/2015 |
| WO | WO-2007114895 A2 | 10/2007 |
| WO | WO-2013163585 A1 | 10/2013 |

OTHER PUBLICATIONS

International Search Report and Written Opinion dated Jun. 26, 2015, PCT Patent Application No. PCT/US2014/058380 filed Sep. 30, 2014, Koren Intellectual Property Office.

Lappo et al., "Discrete Multiple Material Selective Laser Sintering (M2SLS): Experimental Study of Part Processing", The University of Texas at Austin, Austin, TX, USA.

GENERATING A THREE-DIMENSIONAL OBJECT

CLAIM FOR PRIORITY

The present application is a national stage filing under 35 U.S.C. § 371 of PCT application number PCT/US2014/058380, having an international filing date of Sep. 30, 2014, the disclosure of which is hereby incorporated by reference in its entirety.

BACKGROUND

Additive manufacturing systems, such as powder-based systems, generate three-dimensional objects through implementation of a layer-by-layer fabrication process. For instance, portions of a powder-based build material may be solidified at each layer to form the three-dimensional objects. These types of systems have been used to build three-dimensional objects having relatively complex internal and external features.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein is an apparatus for generating a three-dimensional object to include multiple types of materials. For instance, the apparatus includes a build material distributor to distribute a build material and a secondary material ejection device to apply a secondary material. According to an example, the secondary material may be applied and a layer of build material may be distributed around the applied secondary material. The build material may be distributed around the applied secondary material to have the same or substantially the same height as the applied secondary material. In addition, a coalescing agent may be ejected onto selected portions of the build material as well as the secondary material. Moreover, energy may be applied over the ejected coalescing agent, the applied secondary material, and the build material during a single pass or during multiple passes. The applied energy may cause the secondary material to fuse together and the build material to coalesce and fuse together. In one regard, therefore, the secondary material and the build material may become fused during a single fusing operation. As discussed in greater detail below, the coalescing agent may become sufficiently heated to cause the build material to coalesce and the secondary material to coalesce and may thus enhance coalescence of these materials during application of the energy.

According to a particular example, the build material is a thermoplastic material and the secondary material is an electrically conductive material, such as a solder material. In this example, the fusing operation may be performed to melt the secondary material to form part of a three-dimensional object, such as an electrically conductive trace (i.e., an electrically conductive wire). In addition, the fusing operation may solidify portions of the thermoplastic powder-based material to embed the electrically conductive trace within the thermoplastic powder-based material. Thus, an electrically conductive trace may be embedded within the thermoplastic material, which is a non-electrically conductive material.

Figure 1:
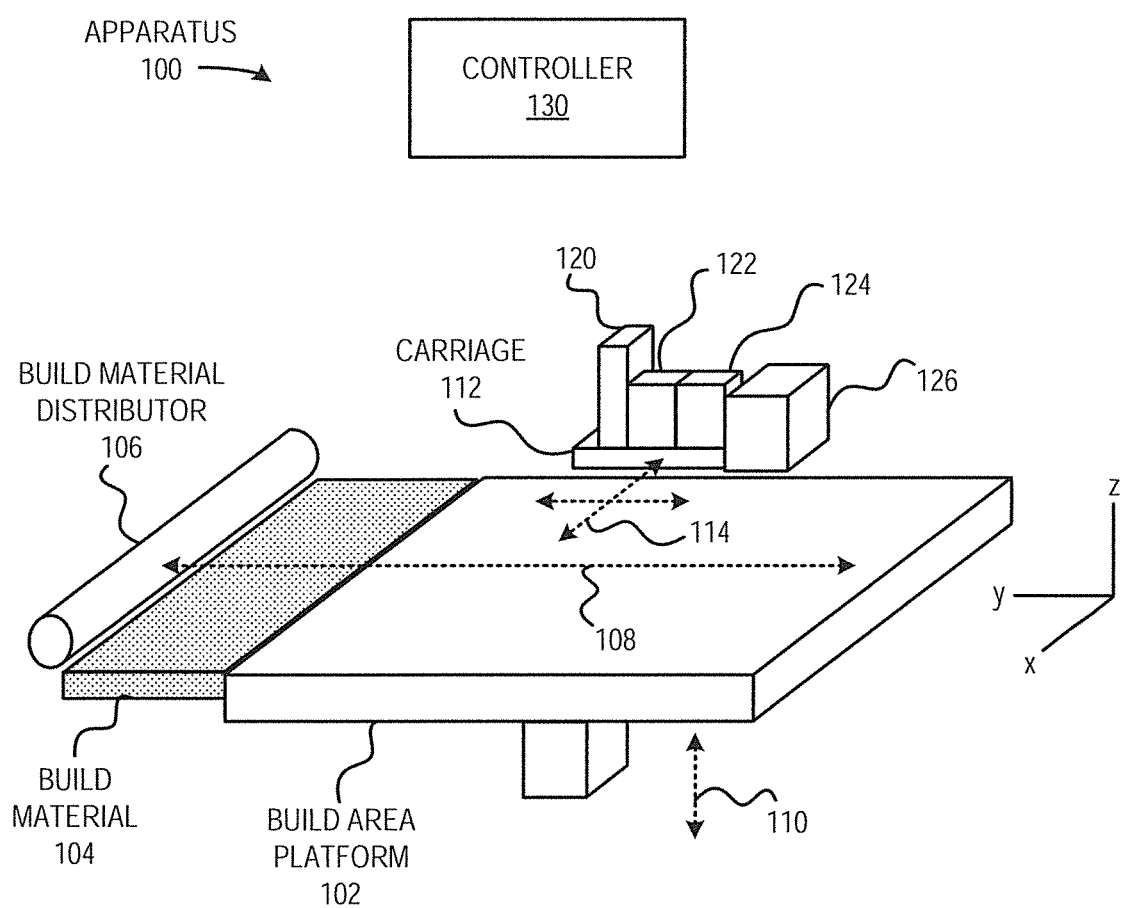
FIG. 1 shows a simplified isometric view of an apparatus for generating a three-dimensional object, according to an example of the present disclosure.

With reference first to FIG. 1, there is shown a simplified isometric view of an apparatus 100 for generating a three-dimensional object, according to an example. It should be understood that the apparatus 100 depicted in FIG. 1 may include additional components and that some of the components described herein may be removed and/or modified without departing from a scope of the apparatus disclosed herein. It should also be understood that the apparatus 100 depicted in FIG. 1 may not be drawn to scale and thus, the apparatus 100 may have a different size and/or configuration other than as shown therein. For instance, the apparatus 100 may include additional material ejecting devices, for instance, to generate three-dimensional objects with greater than two different types of materials.

As shown in FIG. 1, the apparatus 100 includes a build area platform 102 that includes a build area surface on which a three-dimensional object is to be generated from a build material 104. The build material 104 may be contained in a hopper or build material store (not shown) and may be applied as desired onto the build area platform 102 by a build material distributor 106. For instance, the build material 104 may be stored at a slightly higher elevation as compared to the build area platform 102 and the build material distributor 106 may move in the y-direction as denoted by the arrow 108 to apply or form a layer of the build material 104 onto the build area platform 102. According to an example, the build area platform 102 may be moved in a downward direction as denoted by the arrow 110 and additional layers of the build material 104 may be formed as layers of a three-dimensional object are generated.

According to an example, the build material 104 is a powder-based build material. As used herein, the term powder-based build material is intended to encompass dry powder-based materials, wet powder-based materials, particulate materials, granular materials, etc. In other examples, the build material 104 may be used with other suitable build materials, with suitable modification if appropriate. In still other examples, the build material 104 may be any other suitable form of build material. By way of particular example, the build material 104 is nylon plastic having particle sizes of about 50 microns on average.

According to a particular example, the build material 104 is a powdered thermoplastic material. One suitable material may be Nylon 12, which is available, for example, from Sigma-Aldrich Co, LLC. Another suitable material may be PA2200, which is available from Electro Optical Systems EOS GmbH. In other examples, the build material 104 may include, for example, powdered metal materials, powdered composited materials, powder ceramic materials, powdered glass materials, powdered resin material, powdered polymer materials, and the like.

In still other examples, the build material 104 may be a liquid, a paste, or a gel. Examples of the build material 104 include polymeric semi-crystalline plastic materials with a wide processing window of greater than 5° C. (i.e., the temperature range between the melting point and the re-crystallization temperature). In an example, the processing window ranges from 15° C. to about 30° C.

Examples of suitable build materials 104 may include polyamides, polyethylene, polyethylene terephthalate (PET), and amorphous variations of these materials. Still other examples of suitable build materials 104 may include polystyrene, polyacetals, polypropylene, polycarbonate, polyester, polyurethanes, other engineering plastics, and blends of any two or more of the polymers listed herein. Core shell polymer particles of these materials may also be used.

The build material 104 may have a melting point ranging from about 55° C. to about 450° C. Some specific examples of the build material 12 having their melting point within this range include polyamides, such as nylon 11, nylon 12, nylon 6, nylon 8, nylon 9, nylon 66, nylon 612, nylon 812, nylon 912, etc. As examples, polyamide 12 has a melting point of about 180°, polyamide 6 has a melting point of about 220°, and polyamide 11 has a melting point of about 200°.

The build material 104 may also be a modified polyamide. In an example, the modified polyamide material is an elastomeric modified polyamide that melts at a lower temperature than nylon 12.

When the build material 104 is in powder form, the build material 12 may be made up of similarly sized particles or differently sized particles. In an example, the build material 104 includes particles of three different sizes. In this example, the average size of the first particle is larger than the average size of the second particle, and the average size of the second polymer particle may be larger than the average size of the third polymer particle. The term "size", as used herein, refers to the diameter of a spherical particle, or the average diameter of a non-spherical particle (i.e., the average of multiple diameters across the non-spherical particle). In general, the average size of the particles of the build material 104 may range from about 10 μm to about 100 μm. In some examples, the average size of the particles of the build material 104 ranges from about 40 μm to about 50 μm.

As an example of the different sizes for each of the particles, the average size of the first particle may be greater than 50 μm, the average size of the second particle may be between 10 μm and 30 μm, and the average size of the third particle may be equal to or less than 10 μm. In an example, the first polyamide particle is present in an amount ranging from about 70 wt % to about 95 wt %, the second polyamide particle is present in an amount ranging from about 0.5 wt % to about 21 wt %, and the third polyamide particle is present in an amount ranging from greater than 0 wt % up to about 21 wt %.

As shown in FIG. 1, the build material distributor 106 may be a doctor blade. However, it should be understood that the build material distributor 106 may be any other device suitable for spreading the build material 104 over the build area platform 102. For instance, the build material distributor 106 may be a counter rotating roller.

The apparatus 100 may also include a carriage 112 that may be movable in either or both of the x and y directions as denoted by the arrows 114. Although not shown, the carriage 112 may be supported on rods or other structures that enable the carriage 112 to move in the directions denoted by the arrows 114.

As shown, the carriage 112 may support a secondary material ejection device 120, a coalescing agent ejection device 122, a coalescence modifier agent ejection device 124, and an energy source 126. The carriage 112 may thus modify the positions of these elements to thus enable selective control over the placement of a secondary material, a coalescing agent, and, in some examples, a coalescence modifier agent, with respect to the build area platform 102. These elements 120-126 are discussed in greater detail below. Also discussed in greater detail below is a controller 130 that is to control operations of the various components depicted in FIG. 1. Although not shown for purposes of clarity, the controller 130 may be in communication with each of the build material distributor 106, the carriage 112, the secondary material ejection device 120, the coalescing agent ejection device 122, the coalescence modifier agent ejection device 124, and the energy source 126. In other examples, the elements 120-126 may remain relatively static with respect to the build area platform 102 in the x and y directions and the build area platform 102 may move in the x and y directions.

According to other examples, some of the elements 120-126 may not be positioned on the carriage 112. For instance, the apparatus 100 may include another carriage (not shown) and the secondary material ejection device 120 may be positioned on the other carriage. In addition, the energy source 126 may be positioned on the other carriage, a separate carriage (not shown), or coupled to move with the build material distributor 106. The energy source 126 may thus be separately movable from the secondary material ejection device 120 and/or the coalescence agent delivery device 122.

As a further example, the carriage 112 may be a page-wide array and the coalescing agent ejection device 122 and the coalescence modifier agent ejection device 124 may each extend substantially the entire width of the build area platform 102. In this example, the carriage 112 may be movable along one dimension (e.g., the y-axis) and the coalescing agent ejection device 122 and the coalescence modifier agent ejection device 124 may be selectively activated to apply coalescing agent and/or coalescence modifier agent at desired locations substantially across the width of the build area platform 102 without scanning the carriage 112 along a second dimension (e.g., the x-axis). In addition, the secondary material ejection device 120 may be positioned on another carriage that is movable along multiple dimensions to enable selective placement of the secondary material. Moreover, in this example, the energy source 126 may be positioned on any of the elements discussed above and is thus not limited to being positioned on the carriage 112.

Figure 2:
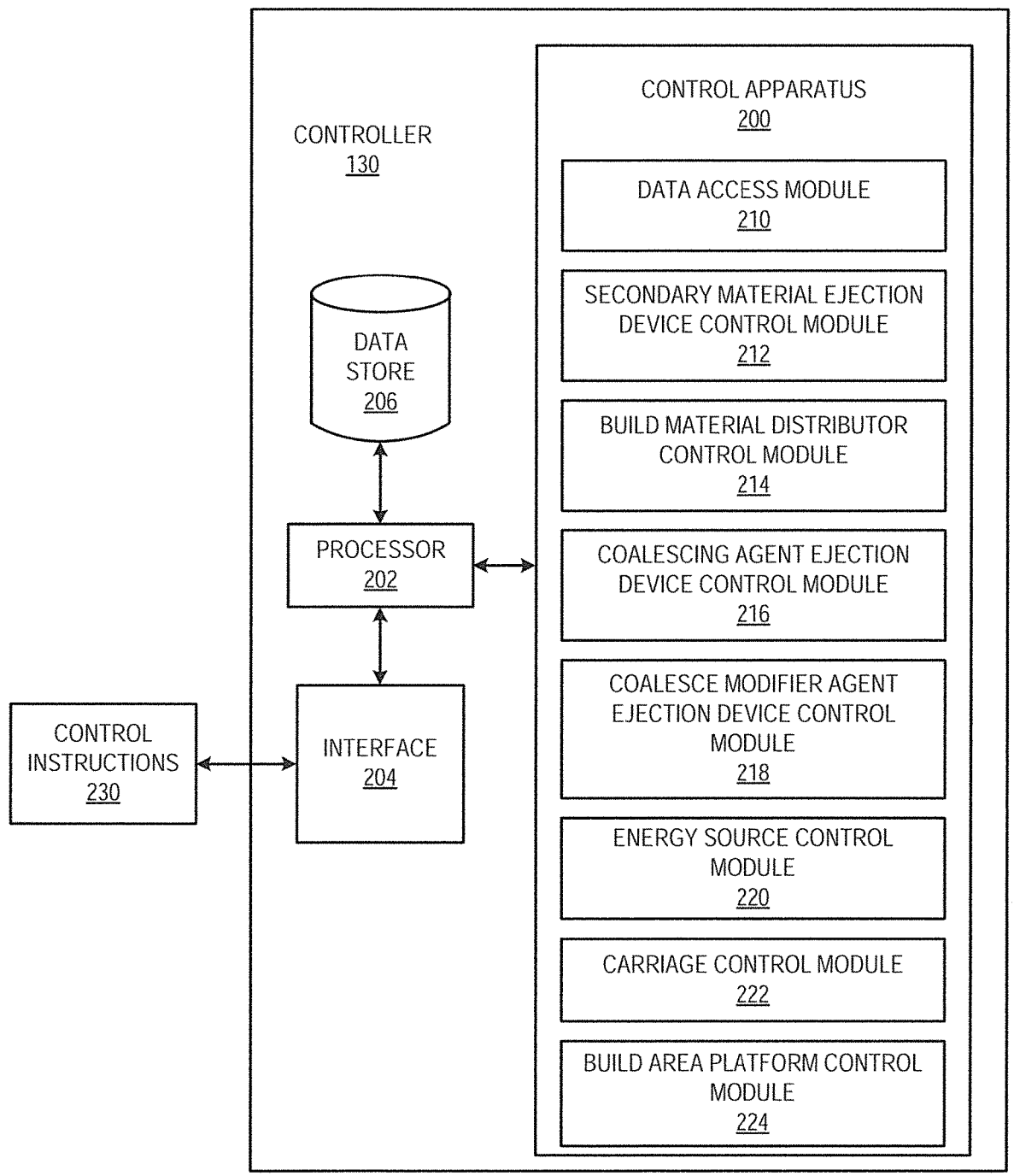
FIG. 2 shows a simplified block diagram of the controller depicted in FIG. 1, according to an example of the present disclosure.

Turning now to FIG. 2, there is shown a simplified block diagram of the controller 130 depicted in FIG. 1, according to an example. It should be understood that the controller 130 depicted in FIG. 2 may include additional elements and that in some examples some of the elements depicted therein may be removed and/or modified without departing from a scope of the controller 130. The controller 130 may be part of the apparatus 100 depicted in FIG. 1 or may be part of another entity that is separate from the apparatus 100 depicted in FIG. 1, such as an entity that provides computing services for the apparatus 100.

The controller 130 is depicted as including a control apparatus 200, a processor 202, an interface 204, and a data store 206. The control apparatus 200 is also depicted as including a data access module 210, a secondary material ejection device control module 212, a build material distributor control module 214, a coalescing agent ejection device control module 216, a coalesce modifier agent ejection device control module 218, an energy source control module 220, a carriage control module 222, and a build area platform control module 224.

The processor 202, which may be a microprocessor, a micro-controller, an application specific integrated circuit (ASIC), or the like, is to perform various processing functions in the controller 130. The processing functions may include invoking or implementing the modules 210-224 contained in the control apparatus 200, as discussed in greater detail herein below. According to an example, the control apparatus 200 is a hardware device on which is stored various sets of machine readable instructions. The control apparatus 200 may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 210-224 may be software modules, e.g., sets of machine readable instructions, stored in the control apparatus 200.

In another example, the control apparatus 200 may be a hardware component, such as a chip, an integrated circuit, etc., and the modules 210-224 may be hardware modules on the hardware component. In a further example, the modules 210-224 may include a combination of software and hardware modules. In a yet further example, the processor 202 may be an ASIC that is to perform the functions of the modules 210-224. In this example, the processor 202 and the control apparatus 200 may be a single processing apparatus.

The processor 202 may store data in the data store 206 and may use the data in implementing the modules 210-224. For instance, the processor 202 may receive data, such as a three-dimensional model, pertaining to a three-dimensional object that is to be generated by the apparatus 100. By way of example, the processor 202 may process the three-dimensional model to generate slices of parallel planes of the model. Each slice may define a portion of a respective layer of build material 104 that is to be solidified during an additive manufacturing process as well as whether and where the secondary material is to be provided in the respective layer. The number of slices generated from the three-dimensional model may be related to the thickness of each layer that the apparatus 100 is to generate or process. In this example, the processor 202 may store information pertaining to each slice in the data store 206. In addition, the processor 202 may access the information contained in the data store 206 to determine how each of the modules 210-224 is to be controlled. In other examples, the slices may be generated by another computing device and the processor 202 may receive the generated slices.

In any regard, the data store 206 may be volatile and/or non-volatile memory, such as DRAM, EEPROM, MRAM, phase change RAM (PCRAM), memristor, flash memory, and the like. In addition, or alternatively, the data store 206 may be a device that may read from and write to a removable media, such as, a floppy disk, a CD-ROM, a DVD-ROM, or other optical or magnetic media.

The interface 204 may include hardware and/or software to enable the processor 202 to communicate control instructions 230 to the components of the apparatus 100. The interface 204 may enable a wired or wireless connection to the apparatus components.

Figure 3:
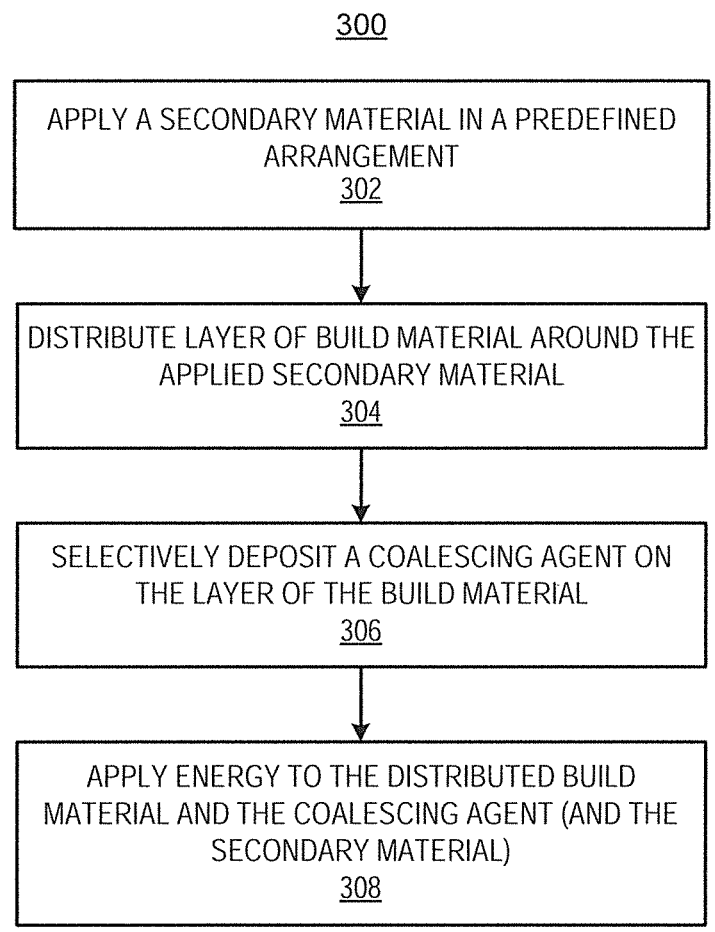
FIG. 3 shows a flow diagram of a method for generating a three-dimensional object, according to an example of the present disclosure.
Figure 6:
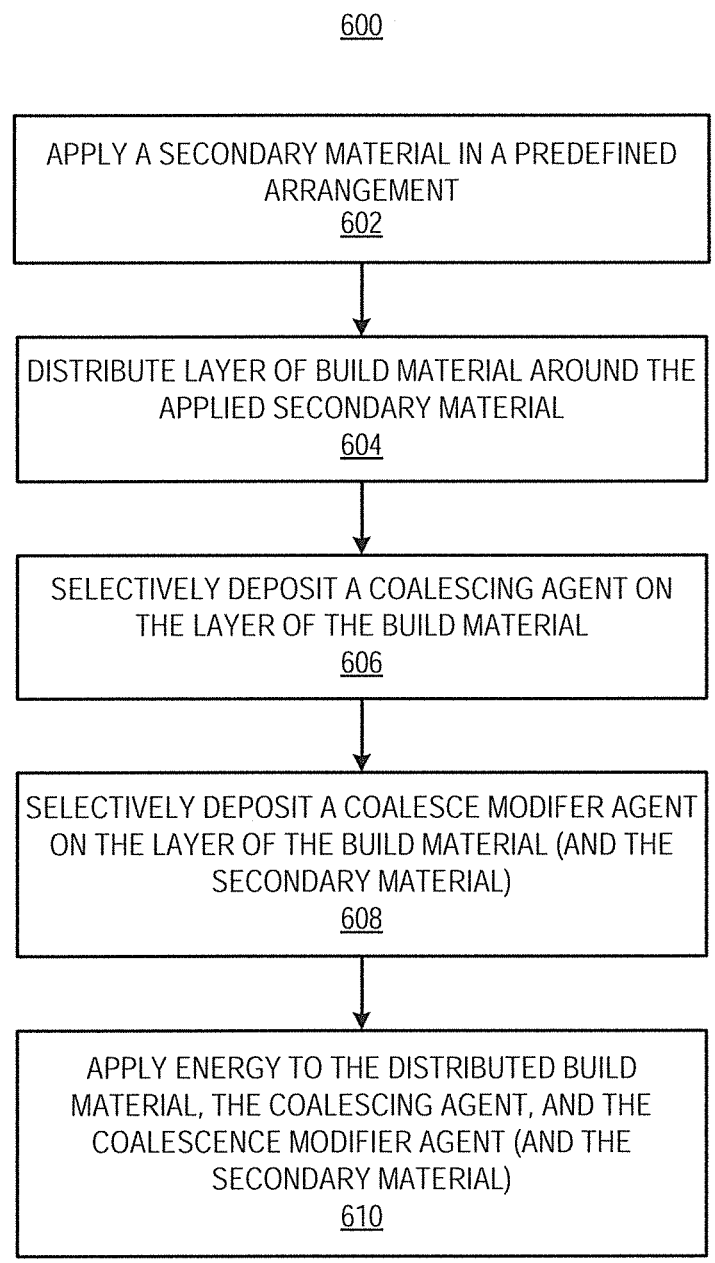
FIG. 6 shows a flow diagram of a method for generating a three-dimensional object, according to another example of the present disclosure.

Various manners in which the processor 202 in general, and the modules 210-224 in particular, may be implemented are discussed in greater detail with respect to the methods 300 and 600 respectively depicted in FIGS. 3 and 6. Particularly, FIGS. 3 and 6 depict flow diagrams of methods 300 and 600 for generating a three-dimensional object, according to two examples. It should be apparent to those of ordinary skill in the art that the methods 300 and 600 may represent generalized illustrations and that other operations may be added or existing operations may be removed, modified, or rearranged without departing from the scopes of the methods 300 and 600. Generally speaking, the processor 202 depicted in FIG. 2 may implement the methods 300 and 600 through implementation of at least some of the modules 210-224.

The descriptions of the methods 300 and 600 are made with reference to the apparatus 100 illustrated in FIG. 1 for purposes of illustration. It should, however, be clearly understood that apparatuses having other configurations may be implemented to perform the methods 300 and 600 without departing from the scopes of the methods 300 and 600. The methods 300 and 600 are also described with respect to the drawings depicted in FIGS. 4A-4D and FIGS. 5A-5D for purposes of illustration and not to limit the disclosed examples to the features depicted in those drawings.

With reference first to the method 300 depicted in FIG. 3, at block 302, a secondary material may be applied in a predefined arrangement. Particularly, for instance, the processor 202 may implement the data access module 210 to access data pertaining to a three-dimensional object that the apparatus 100 is to generate. The data access module 210 may access a three-dimensional model of the object and may generate slices of parallel planes of the model. One of the generated slices may include information pertaining to the predefined arrangement of the secondary material placement. Additional ones of the generated slices may also include information pertaining to the predefined arrangement of the secondary material placement in instances in which the secondary material is to be applied across multiple layers of the three-dimensional object.

In addition, at block 302, the processor 202 may implement the secondary material ejection device control module 212 to generate instructions pertaining to how the secondary material ejection device 120 is to be operated to apply the secondary material as indicated in a generated slice containing information pertaining to the predefined arrangement of the secondary material placement. Moreover, the processor 202 may output control instructions 230 to the secondary material ejection device 120, as well as the carriage 112, to cause the secondary material ejection device 120 to apply the secondary material at the predefined locations. The processor 202 may implement the carriage control module 222 to determine control instructions 230 for the carriage 112.

The secondary material ejection device 120 may be any suitable type of device that is to deposit the secondary material either from a self-contained supply or an external supply of the secondary material. For instance, the secondary material ejection device 120 may be a syringe-like apparatus that is to deposit the secondary material with relatively high precision, e.g., an apparatus having a relatively small opening to enable a controlled amount of the secondary material to be delivered. As another example, the secondary material ejection device 120 may include an oscillating piston that is to cause the secondary material to flow out of the secondary material ejection device 120 in a controlled manner.

As a further example, the secondary material may be maintained in liquid or gel form through application of heat and may solidify as the secondary material sufficiently cools. In this example, the secondary material ejection device 120 may include a heating element to maintain the secondary material in liquid or gel form and may deposit the secondary material as a liquid or a gel. In addition, the deposited secondary material may solidify as the secondary material cools.

Figure 4A:
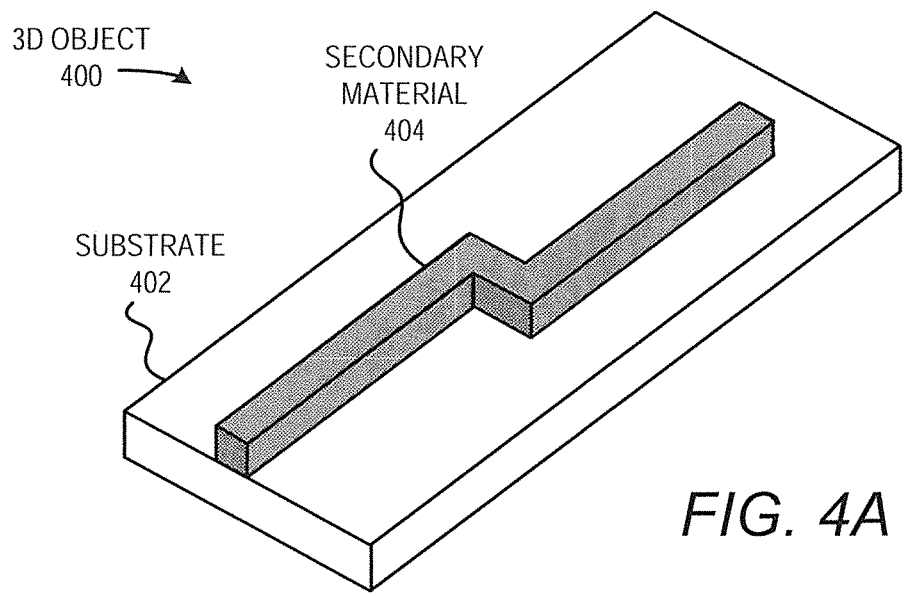
FIGS. 4A-4D, collectively, show a process in which an apparatus is used to generate a three-dimensional object, according to an example of the present disclosure.

An example of a process in which the apparatus 100 is used to generate a three-dimensional object 400 to contain the secondary material and the build material 104 is depicted in FIGS. 4A-4D. With reference to FIG. 4A, a secondary material 404 is depicted as being applied in a predefined arrangement on a substrate 402. The substrate 402 may represent any suitable structure on which the secondary material 404 may be applied. For instance, the substrate 402 may be the build area platform 102 or another base upon which the secondary material 404 may be applied. As another example, the substrate 402 may be a layer of build material 104 that has been previously formed and portions thereof solidified. It should be clearly understood that FIGS. 4A-4D depict simplified illustrations of the three-dimensional object 400 and that therefore the three-dimensional object 400 may include various other shapes. For instance, although the applied secondary material 404 has been depicted as having rectangular cross-sections, the secondary material 404 may have alternate shapes, for instance, shapes that are more likely to occur through deposition of the secondary material 404 through the secondary material ejection device 120 discussed herein. Examples of such shapes are depicted in FIGS. 5A-5D.

The secondary material 404 may be any suitable material that differs from the build material 104. For instance, the secondary material 404 may be a dry powder-based material, a wet powder-based material, particulate material, granular material, etc., that differs from the build material 104. By way of particular example, the build material 104 is a powdered thermoplastic material and the secondary material 404 is a powdered electrically conductive material, such as a conductive metal. In this example, the secondary material 404 may be applied to form an electrically conductive trace, e.g., electrically conductive wire, and the build material 104 may be applied to form a protective and electrically insulative covering around the electrically conductive trace. In addition, the powdered electrically conductive material may include solder particles having for instance, an average particle size of about 20 microns. By way of example, the secondary material may be a solder paste containing powdered metal solder. In addition, the secondary material may include metals such as, tin, silver, copper, antimony, etc., and alloys formed from such metals. As discussed above, the secondary material may also be a liquid, gel, or paste material.

At block 304, a layer of build material 104 may be applied around the applied secondary material. The processor 202 may implement the build material distributor control module 214 to generate instructions to control operation of the build material distributor 106. Moreover, the processor 202 may output control instructions 230 to the build material distributor 106 to cause the build material 106 to be distributed around the applied secondary material. For instance, the build material distributor 106 may scrape a layer of build material 104 onto the build area platform 102 or a previously formed layer of build material 104 and may cause another layer of the build material 104 to be formed.

Figure 5A:
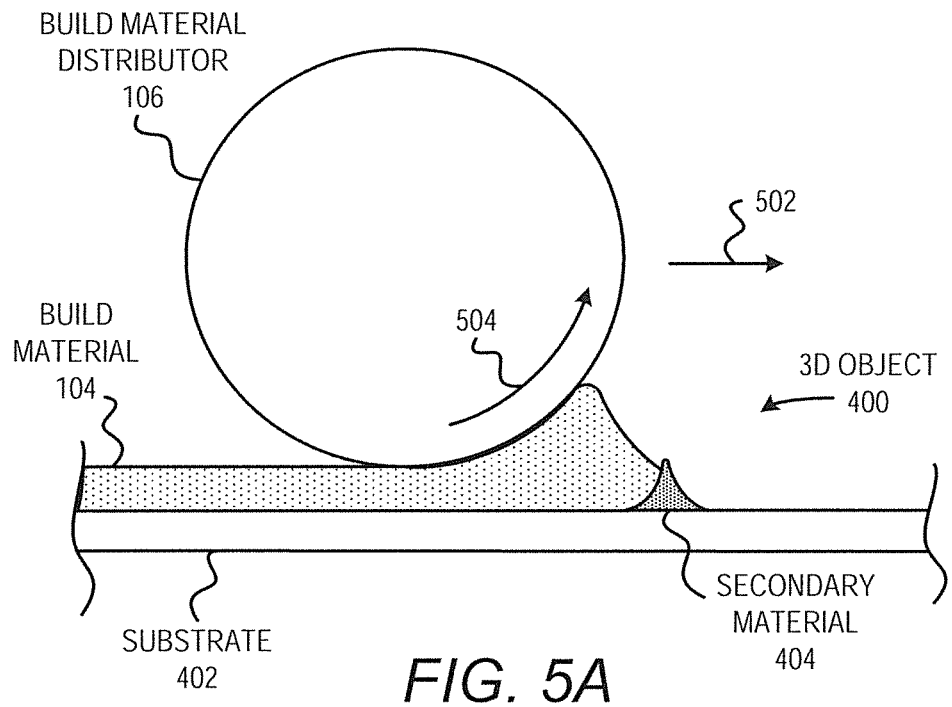
FIGS. 5A-5D, collectively, show a process in which a build material may be applied around an applied secondary material, according to examples of the present disclosure.
Figure 5B:
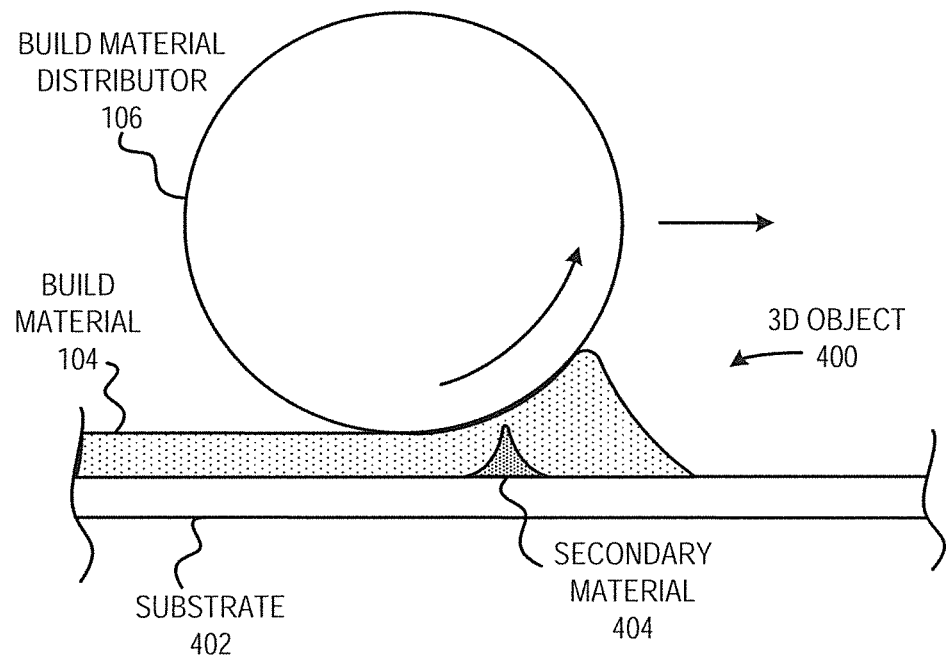
Figure 5C:
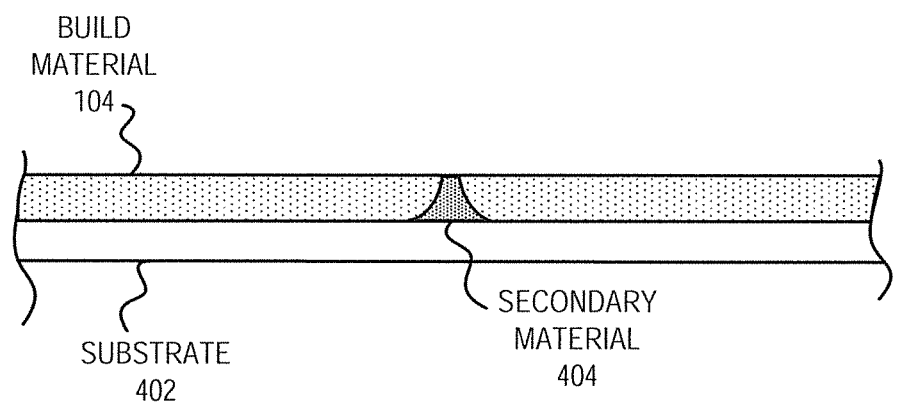
Figure 5D:
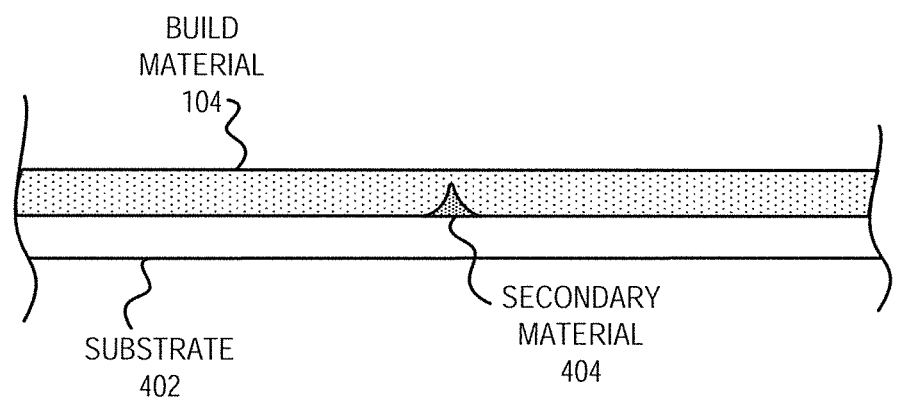

Examples of manners in which the build material 104 may be applied around the secondary material 404 are depicted in FIGS. 5A-5D. Particularly, FIGS. 5A-5C show parts of a simplified process in which build material 104 is applied around a secondary material 404 and FIG. 5D shows an alternate application of the build material 104 around the secondary material 404. It should be clearly understood that the examples depicted in FIGS. 5A-5D may not be drawn to scale and are instead for illustrative purposes.

Starting with FIG. 5A, following application of the secondary material 404 on the substrate 402, a layer of build material 104 may be deposited on a portion of the substrate 402. The layer of build material 104 may be deposited to have a height that is substantially higher than the height of the applied secondary material 404. In addition, the build material distributor 106 may be positioned at a predetermined height above the substrate 404 to form the layer of build material 104 at a desired height. Particularly, for instance, as the build material distributor 106 advances, as noted by the arrow 502, the build material 104 flows into place around the applied secondary material 404. At this point, the build material 104 may avalanche due to the competing forces of gravity and the upward/lateral movement of the build material distributor 106 (arrow 504). Because of this type of movement by the build material 104, are relatively small amount of force may be present at the interface of the secondary material 404 and the build material 104. For instance, both the build material 104 and the secondary material 404 may be uncompacted by the build material distributor 106.

Turning now to FIG. 5B, there is shown a part of the process in which a portion of the build material 104 has avalanched over the applied secondary material 404. At this point, the relatively movement of the build material distributor 106 and the secondary material 404 may almost be purely lateral, which may cause both the build material 104 and the applied secondary material 404 beneath the build material distributor 106 to compact. In FIG. 5C, following movement of the build material distributor 106 past the applied secondary material 404, the build material distributor 106 may have removed a top portion of the applied secondary material 404. In addition, during movement of the build material distributor 106 over the applied secondary material 404, the applied secondary material 404 may be supported by the portions of the build material 104 that are in contact with the applied secondary material 404. The portions of the build material 104 that are in contact with the applied secondary material 404 may thus prevent gross deformation of the applied secondary material 404.

According to an example, the thickness of the applied secondary material 404 may be adjusted to vary the characteristics of the three-dimensional object 400. For instance, in FIG. 5C, the applied secondary material 404 may have a height that causes a top portion of the applied secondary material 404 to be exposed following movement of the build material distributor 106 over the applied secondary material 404. In another example, as shown in FIG. 5D, the applied secondary material 404 may have a relatively shorter height such that the build material 104 encases the applied secondary material 404. As such, for instance, electrically conductive traces may be formed in multiple layers of the three-dimensional object 400 and the electrically conductive traces may either be in electrical communication with each other or electrically insulated from each other. The characteristics of the three-dimensional object 400 may be modified through other operations. For instance, the height of the build material 104 applied around the secondary material 404 may be varied by varying the relative distance between the build material distributor 106 and the applied secondary material 404.

According to another example, the applied secondary material may be partially or fully solidified prior to application of the build material 104 around the applied secondary material. For instance, a coalescing agent may be deposited onto the applied secondary material and energy may be applied to the coalescing agent to cause the applied secondary material to solidify. In another example in which the secondary material is a liquid or a gel that is to become solidified when maintained a certain temperatures, e.g., at or around room temperature, the applied secondary material may be allowed to cool prior to application of the build material 104.

Figure 4B:
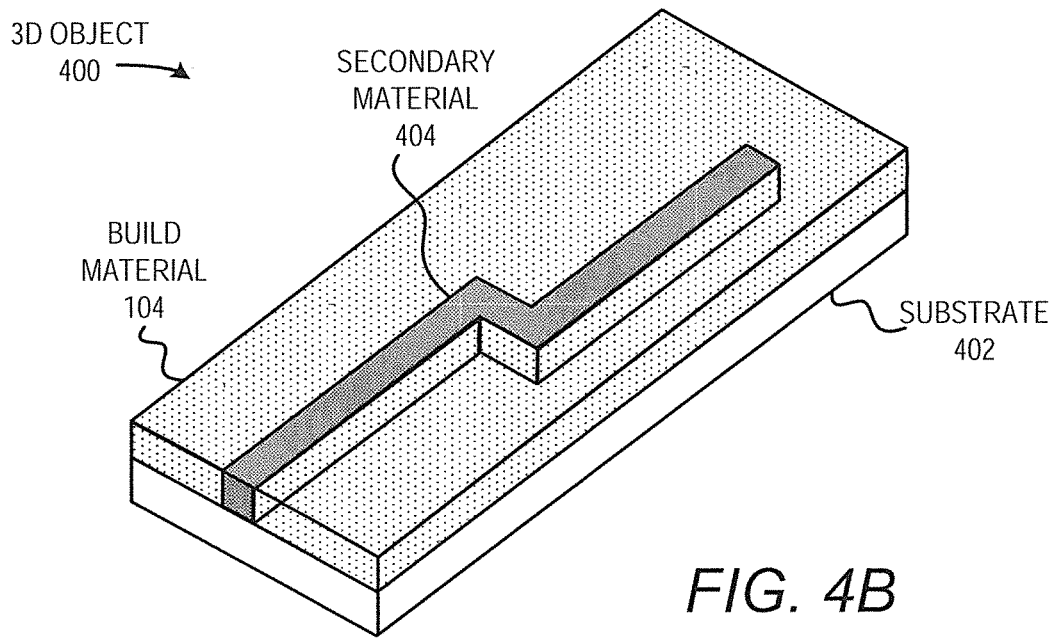

As shown in FIG. 4B, the build material 104 may be distributed around the secondary material 404 such that portions of the build material 104 are in contact with the secondary material 404. In addition, according to an example, the build material distributor 106 may spread the build material 104 around the secondary material 404 such that the build material 104 has the same or approximately the same height as the secondary material 404.

According to an example, the secondary material to be applied with the build material may be selected based upon the melting temperatures of the build material and the secondary material. For instance, the selected secondary material may have a melting temperature that does not exceed the melting temperature of the build material by more than about 20° C. Examples of suitable combinations of build materials and secondary materials is provided below in the following table:

TABLE I

| Build Material | Melting Point | Secondary Material | Liquidus Temperature |
|---|---|---|---|
| Arkema Rilsan Invent PA-11 ™ | 200° C. | SAC305 | 220° C. |
| Evonik X1556 PA-12 ™ | 180° C. | Sn91Zn09 | 200° C. |
| Nylon 6-6 | 270° C. | Pb88Sn10Ag02 | 290° C. |
| PEEK (Polyether ether ketone) | 343° C. | Pb94.5Ag5.5 | 365° C. |

In Table I, Arkema Rilsan Invent PA-11™ refers to a polyamide 11 material available from Arkema of Colombes, France. Evonik X1556 PA-12™ refers to a polyamide 12 material available from Evonik Industries of Essen, Germany. SAC305 refers to an alloy that contains 95.5% tin, 3% silver, and 0.5% copper and is available from AIM solder of Montreal, Quebec. Sn91Zn09 refers to an alloy that contains 91% tin and 9% zinc. Pb88Sn10Ag02 refers to an alloy that contains 88% lead, 10% tin, and 2% silver. Pb94.5Ag5.5 refers to an alloy that contains 94.5% lead and 5.5% silver.

At block 306, a coalescing agent may be selectively deposited on the layer of the build material 104. The processor 202 may implement the coalescing agent ejection device control module 216 to generate instructions pertaining to how the coalescing agent ejection device 122 is to be operated to apply the coalescing agent as indicated in a generated slice. For instance, the generated slice may contain information identifying locations on the layer of the applied build material 104 where the coalescing agent is to be selectively deposited. Moreover, the processor 202 may output control instructions 230 to the coalescing agent ejection device 122, as well as the carriage 112, to cause the coalescing agent ejection device 122 to apply the coalescing agent at the predefined locations.

Figure 4C:
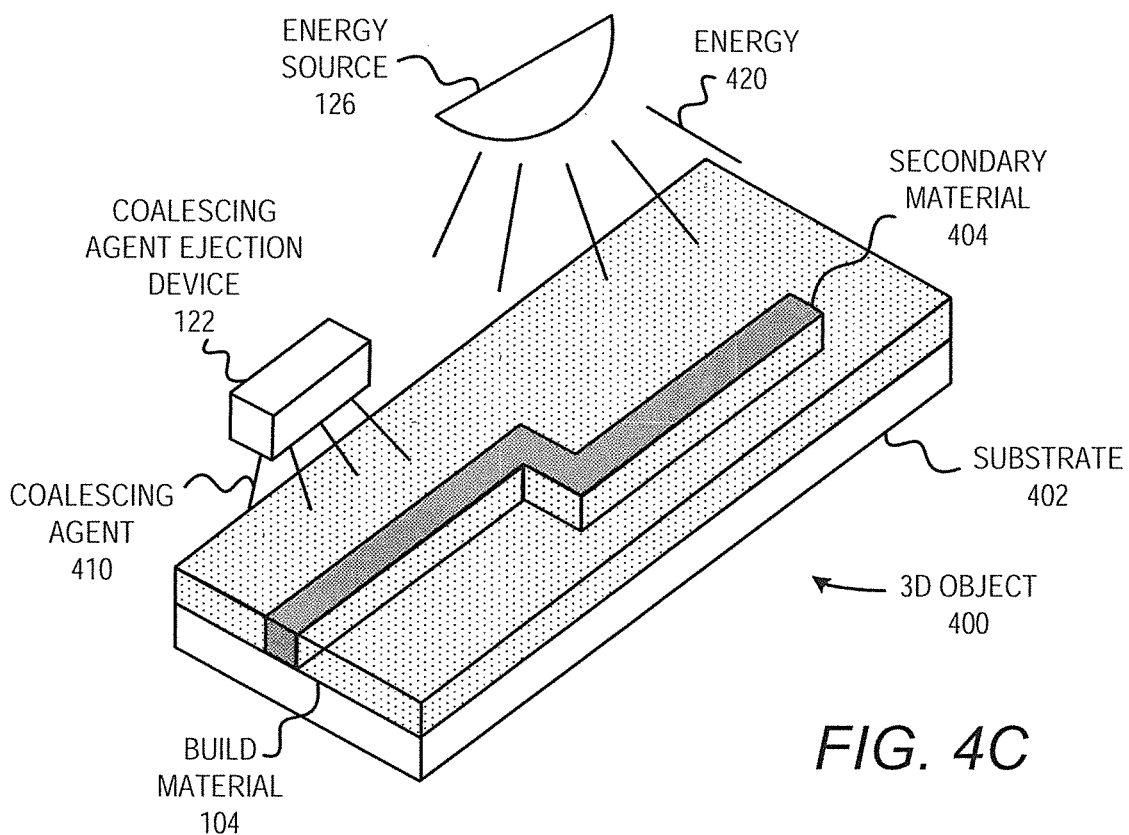

As shown in FIG. 4C, the coalescing agent ejection device 122 may be scanned across the build material 104 and may selectively deposit the coalescing agent 410 onto selected portions of the build material 104. For instance, the processor 202 may control the coalescing agent ejection device 122 to deposit the coalescing agent 410 on all of the sections of the build material 104 that are adjacent to the secondary material 404. In addition, the processor 202 may control the coalescing agent ejection device 122 to substantially prevent the coalescing agent 410 from being deposited onto the secondary material 404.

According to an example, the coalescing agent is a liquid material and the coalescing agent ejection device 122 is a printhead, for instance a thermal inkjet printhead or a piezoelectric inkjet printhead. In any regard, the coalescing agent ejection device 122 may include a supply of coalescing agent or may be connected to a separate supply of coalescing agent.

Generally speaking, the coalescing agent 410 is to penetrate into the build material 104, either completely or partially, and is to cause the portions of the build material 104 with which the coalescing agent 410 is in contact to solidify when sufficient energy is applied onto the coalescing agent 410 and the build material 104. For instance, the coalescing agent 410 may be an electromagnetic radiation absorber that is to become heated and cause the build material 104, which may be in powder form, to reach its melting point and fuse together when sufficient energy is applied, for instance in the form of electromagnetic radiation emitted onto the coalescing agent 410, and the build material 104 is subsequently cooled. In one regard, through selective application of the coalescing agent 410, portions of the build material 104 may be selectively solidified to cause the build material 104 to attain a desired shape.

At block 306, the processor 202 may also implement the coalescing agent ejection device control module 216 to control the coalescing agent ejection device 122 to apply coalescing agent on the applied secondary material. Similarly to the build material 104, the coalescing agent may become heated and cause the secondary material to reach its melting point and fuse together when sufficient energy is applied and the secondary material is subsequently cooled.

According to a non-limiting example, a suitable coalescing agent may be an ink-type formulation having carbon black, such as, for example, the ink formulation commercially known as CM991A available from the Hewlett-Packard Company. In an example, such an ink may additionally include an infra-red light absorber. In another example, such an ink may additionally include a near infra-red light absorber. In a further example, such an ink may additionally include a visible light absorber. Examples of inks having visible electromagnetic radiation enhancers are dye based colored ink and pigment based colored ink.

At block 308, energy may be applied to the distributed build material 104 and the deposited coalescing agent to cause portions of the build material 104 on which coalescing agent has been delivered or has penetrated to become heated above the melting point of the build material 104 and to coalesce. In addition, energy may be applied to the secondary material and the coalescing agent to cause portions of the secondary material on which coalescing agent has been delivered or has penetrated to become heated above the melting point of the secondary material and to coalesce. Upon cooling, the portions of the build material 104 and the portions of the secondary material that have coalesced may become solid and form part of the three-dimensional object being generated. The processor 202 may implement the energy source control module 220 to generate instructions to control operation of the energy source 126. Moreover, the processor 202 may output control instructions 230 to the energy source 126 to cause the energy source 126 to apply energy onto the distributed build material 104 and the deposited coalescing agent. As the energy source 126 applies energy onto the distributed build material 104 and the deposited coalescing agent, the energy source 126 may also apply energy onto the applied secondary material. In this regard, the energy source 126 may also cause the particles of the applied secondary material, which may be a powder-based metallic material, to melt and upon cooling, fuse together. A result of this fusing may be that the electrical conductivity of the applied secondary material may be enhanced to thus enable the applied secondary material to be implemented as an electrically conductive trace.

According to an example, the energy source 126 is an infra-red (IR) or near infra-red light source. In other examples, the energy source 126 emits a wavelength of light from about 800 nm to 10 microns. The energy source 126 may be a single energy source that is to uniformly apply energy to the deposited build material. In other examples, the energy source 126 may include an array of energy sources. In some examples, the energy source 126 is to apply energy in a substantially uniform manner to the whole surface of a layer of build material 104. In these examples, the energy source 126 may be said to be an unfocused energy source and a whole layer of build material 104 may have energy applied thereto simultaneously, which may help increase the speed at which a three-dimensional object may be generated.

In other examples, the energy source 126 is to apply energy in a substantially uniform manner to a portion of the whole surface of a layer of build material 104. For example, the energy source 126 may apply energy to a strip of the layer of build material 104. In these examples, the energy source 126 may be moved or scanned across the layer of build material such that a substantially equal amount of energy is ultimately applied across the whole surface of a layer of build material.

In another example, for instance as shown in FIG. 1, the energy source 126 is mounted on the movable carriage 112. In this example, the energy source 126 may apply energy onto portions of the build material 104 layer and the secondary material 404 directly following application of the coalescing agent onto those portions of the build material 104 and the secondary material 404. In other examples, the energy source 126 is mounted on a separate carriage (not shown), moves with the build material distributor 106, or is otherwise separately movable from the movable carriage 112.

In still other examples, the energy source 126 may apply a variable amount of energy as the energy source 126 is moved across the layer of build material 104, for example in accordance with a predefined energy application operation. For example, the processor 202 may control the energy source 126 to only apply energy to portions of the build material 104 on which coalescing agent has been applied. In another example, the processor 202 may control the energy source 126 to also apply energy onto the deposited secondary material.

In further examples, the energy source 126 may be a focused energy source, such as a laser beam. In this example, the laser beam may be controlled to scan across the whole or a portion of a layer of build material 104. In addition, the laser beam may be controlled to scan across a layer of build material 104 in accordance with a predefined pattern. For example, the laser beam may be controlled to apply energy to those portions of a layer of build material 104 on which coalescing agent is delivered. In addition, the processor 202 may control the energy source 126 to apply energy onto the deposited secondary material.

According to another example, the apparatus 100 may include a second energy source (not shown). In this example, the controller 130 may control the second energy source to apply energy onto the secondary material. Thus, in examples in which the secondary material has a sufficiently different melting point than the build material that the energy source 126 is unable to apply sufficient energy to melt the secondary material, the second energy source may be utilized to apply a higher level of energy to the secondary material to cause the secondary material to melt. Alternatively, the second energy source may apply the same or a smaller amount of energy than the energy source 126. In any regard, the second energy source may be provided on the carriage 112 or may be separately movable from the carriage 112.

As shown in FIG. 4C, the energy source 126 may apply energy 420 onto the build material 104 and the secondary material 404. For instance, the processor 202 may control the energy source 126 to apply energy 420 following application of the coalescing agent 410 by the coalescing agent ejection device 122. According to an example, the processor 202 may control the carriage 112 to scan across the build material 104. While the carriage 112 is scanned, the processor 202 may control the coalescing agent ejection device 122 to selectively deposit coalescing agent 410 onto the build material 104. In addition, the processor 202 may control the energy source 126 to apply energy 420 onto portions of the build material 104 that have received the coalescing agent 410. The processor 202 may also control the energy source 126 to apply energy 420 onto the secondary material 404 following application of the coalescing agent 410 onto the secondary material 404. In addition, the length of time the energy is applied for, or the energy exposure time, may be dependent, for instance, on any of: characteristics of the energy source, characteristics of the build material, characteristics of the coalescing agent, etc.

Figure 4D:
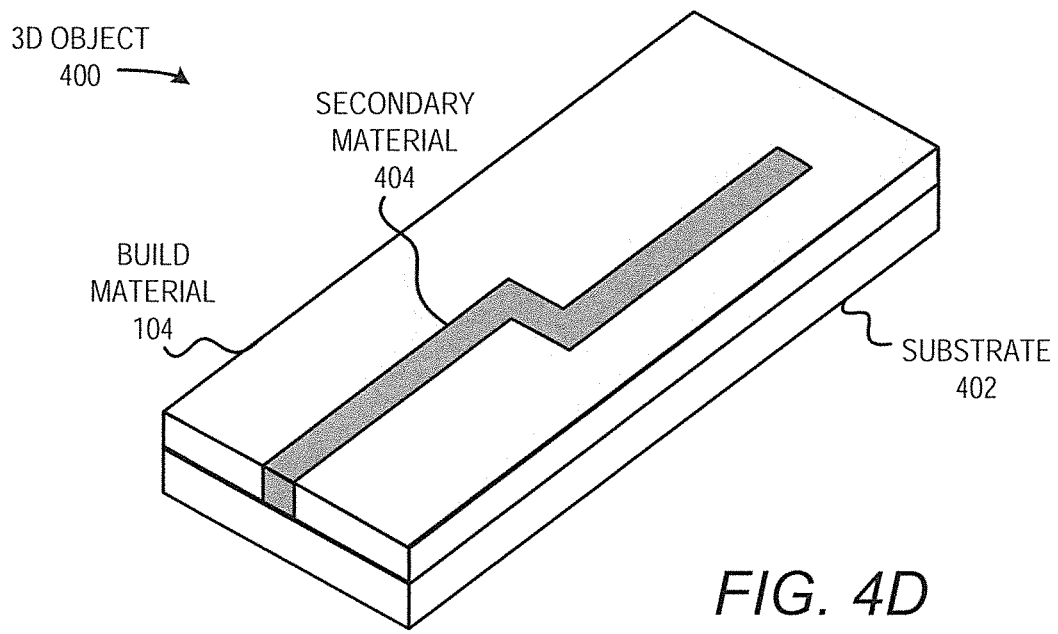

According to the example depicted in FIG. 4C, the processor 202 may control the coalescing agent ejection device 122 to deposit the coalescing agent 410 over all of the exposed build material 104. As such, following application of the energy 420 onto portions of the three-dimensional object 400, as shown in FIG. 4D, most or all of the layer of build material 104 may have coalesced and solidified. In addition, application of the energy 420 onto the coalescing agent on the secondary material 404 may have caused the particles of the secondary material 404 to melt and fuse together to form a part of the three-dimensional object 400, such as an electrically conductive trace. In one example, therefore, the three-dimensional object 400 may include an electrically conductive trace embedded in a plastic structure. Although not shown, portions of the build material 104 upon which the coalescing agent 410 was not applied may not have solidified. Those portions of the build material 104 that have not solidified may be separated from the solidified portions and may be reused or discarded.

Although not shown, the method 300 may be repeated any suitable number of times to build up layers of the secondary material 404 and the build material 104. During iterations of the method 300, the build area platform 102 may be lowered and/or the carriage 112 may be raised such that a new level of the three-dimensional object 400 may be fabricated. The build area platform 102 and/or the carriage 112 may be moved through operation of an actuator (not shown), which the processor 202 may control.

Turning now to FIG. 6, the method 600 includes many of the same features as those described above with respect to the method 300 in FIG. 3. Accordingly, those same features will not be described again with respect to the method 600. For instance, the method 600 includes blocks 302-306.

Following block 306, in FIG. 6, at block 602, a coalescence modifier agent may be selectively deposited on the layer of the build material 104. The processor 202 may implement the coalescence modifier agent ejection device control module 218 to generate instructions pertaining to how the coalescence modifier agent ejection device 124 is to be operated to apply the coalescence modifier agent as indicated in a generated slice. For instance, the generated slice may contain information identifying locations on the layer of the applied build material 104 where the coalescence modifier agent is to be selectively deposited. Moreover, the processor 202 may output control instructions 230 to the coalescence modifier agent ejection device 124, as well as the carriage 112, to cause the coalescence modifier agent ejection device 124 to apply the coalescence modifier agent at the predefined locations.

According to an example, the coalescence modifier agent ejection device 124 may be scanned across the build material 104 and may selectively deposit the coalescence modifier agent onto selected portions of the build material 104. For instance, the processor 202 may control the coalescence modifier agent ejection device 124 to deposit the coalescence modifier agent on all of the sections of the build material 104 that are adjacent to the secondary material. In addition, the processor 202 may control the coalescence modifier agent ejection device 124 to substantially prevent the coalescence modifier agent from being deposited onto the secondary material. By way of particular example, the processor 202 may control the coalescence modifier agent ejection device 124 to apply coalescence modifier agent over portions or all of a previously deposited coalescing agent.

According to an example, the coalescence modifier agent is a liquid material and the coalescence modifier agent ejection device 124 is a printhead, for instance a thermal inkjet printhead or a piezoelectric inkjet printhead. In any regard, the coalescence modifier agent ejection device 124 may include a supply of coalescence modifier agent or may be connected to a separate supply of coalescence modifier agent.

Generally speaking, the coalescence modifier agent is to penetrate into the build material 104 and to act to modify the effects of the coalescing agent. For instance, the coalescence modifier agent may provide different physical and/or chemical effects on the coalescing agent. For example, and without being bound by any theory, in one example the coalescence modifier agent may act to produce a mechanical separation between individual particles of a build material, for example to prevent such particles from joining together and hence preventing them from solidifying to form a portion of a generated three-dimensional object. An example coalescence modifier agent may be a liquid that includes solids. Such an agent may be, for example, a colloidal ink, a dye-based ink, or a polymer-based ink.

The coalescence modifier agent may, after being delivered to a layer of build material, cause a thin layer of solids to cover or partially cover a portion of build material, for example after evaporation of any carrier liquid, and hence may act as a coalescence modifier agent as described herein. According to an example, the coalescence modifier agent may include solid particles that have an average size less than the average size of particles of the build material on which it is to be delivered. Furthermore, the molecular mass of the coalescence modifier agent and its surface tension may be such that the molecular mass enables the coalescence modifier agent to penetrate sufficiently into the build material. In one example, the coalescence modifier agent may have a high solubility such that each drop of coalescence modifier agent includes a high percentage of solids.

In one example, a salt solution may be used as the coalescence modifier agent. In another example, an ink commercially known as CM996A ink and available from Hewlett-Packard Company may be used as the coalescence modifier agent. In a further example, an ink commercially known as CN673A ink and available from Hewlett-Packard Company may be used as the coalescence modifier agent.

In another example, and without being bound by any theory, a coalescence modifier agent may act to modify the effects of a coalescing agent by preventing build material from reaching temperatures above the build material's melting point. For example, the coalescence modifier agent may be a fluid that exhibits a suitable cooling effect on the build material 104. For example, when such an agent is delivered to the build material the energy applied to the build material may be absorbed by the coalescence modifier agent causing the evaporation of the coalescence modifier agent, which may help prevent build material on which the coalescence modifier agent has been delivered or has penetrated from reaching the melting point of the build material.

In one example, the coalescence modifier agent may have a high percentage of a solvent with a large heat of vaporization and a boiling point below the melting point of the build material and/or a high specific heat capacity. An example of a coalescence modifier agent that may increase the degree of coalescence may include, for example a suitable plasticizer. Another example of a coalescence modifier agent that may increase the degree of coalescence may include, for example, a surface tension modifier to increase the wettability of particles of the build material.

In another example, at block 602, a coalescence modifier agent may be selectively deposited on the applied secondary material. In this example, the coalescence modifier agent may include particles that are to improve the electrical conductivity between the particles of the secondary material.

For instance, the coalescence modifier agent may include metallic particles that are relatively smaller in size than the particles of the secondary material and may be positioned between the secondary material particles. In addition, the coalescence modifier agent may be the same or may differ from the coalescence modifier agent that is selectively deposited on the build material.

Portions of the build material 104 and/or the secondary material on which both coalescing agent and coalescence modifier agent have been delivered or have penetrated may undergo a modified degree of coalescence. The degree of modification may depend, for example, on any one or more of: the proportions of the coalescing agent and the coalescence modifier agent at any portion of build material and/or the secondary material; the pattern in which coalescing agent is delivered to build material and/or the secondary material; the pattern in which coalescence modifier agent is delivered to build material and/or the secondary material; the chemical properties of the coalescing agent; the chemical properties of the coalescence modifier agent; the chemical properties of the build material and/or the secondary material; the chemical interaction between the build material and/or the secondary material and the agents; and the interactions between the build material and/or the secondary material and agents whilst energy is applied.

Selective delivery of the coalescing agent and the coalescence modifier agent may be defined herein as meaning that the coalescing agent and the coalescence modifier agent may be delivered to selected portions of the surface layer of the build material and/or the secondary material in respective independent patterns. The patterns may be defined by data derived from a model of a three-dimensional object to be created. In some examples, the coalescing agent may be selectively delivered to a portion of build material 104 according to a first pattern, and the coalescence modifier agent may be selectively delivered to a portion of build material 104 according to a second pattern. In one regard, the object properties of a portion of the generated three-dimensional object may be controllably variable depending on the patterns in which the coalescing agent and the coalescence modifier agent are delivered to the build material 104.

With reference back to FIG. 6, at block 604, energy may be applied to the distributed build material 104, the deposited coalescing agent, the deposited coalescence modifier agent, and the secondary material. The processor 202 may implement the energy source control module 220 to generate instructions to control operation of the energy source 126. Moreover, the processor 202 may output control instructions 230 to the energy source 126 to cause the energy source 126 to apply energy onto the distributed build material 104, the deposited coalescing agent, the deposited coalescence modifier agent, and the secondary material. As the energy source 126 applies energy onto the distributed build material 104, the deposited coalescing agent, and the deposited coalescence modifier agent, the energy source 126 may also apply energy onto the applied secondary material. In this regard, the energy source 126 may also cause the particles of the applied secondary material, which may be a powder-based electrically conductive material, to melt and fuse together. A result of this fusing may be that the electrical conductivity of the applied secondary material may be enhanced to thus enable the applied secondary material to be implemented as an electrically conductive trace.

Although particular reference has been made with respect to the method 600 that the coalescing agent is deposited prior to the coalescence modifier agent, it should be understood that the coalescence modifier agent may be deposited prior to the coalescing agent without departing from a scope of the present disclosure.

Similarly to the discussion above directed to the method 300, the method 600 may be repeated any suitable number of times to build up layers of the secondary material and the build material 104. During iterations of the method 600, the build area platform 102 may be lowered and/or the carriage 112 may be raised such that new levels of the three-dimensional object may be fabricated.

Some or all of the operations set forth in the methods 300 and 600 may be contained as utilities, programs, or subprograms, in any desired computer accessible medium. In addition, the methods 300 and 600 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 7:
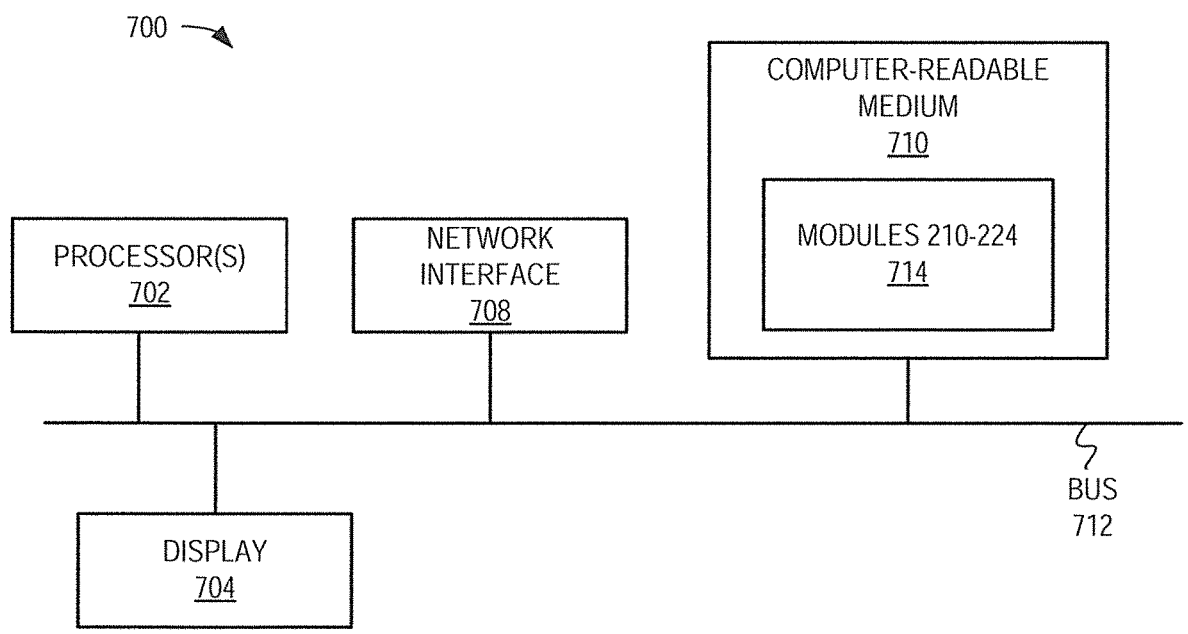
FIG. 7 shows a schematic representation of a computing device, which may be employed to perform various functions of the controller depicted in FIGS. 1 and 2, according to an example of the present disclosure.

Turning now to FIG. 7, there is shown a schematic representation of a computing device 700, which may be employed to perform various functions of the controller 130 depicted in FIGS. 1 and 2, according to an example. The computing device 700 may include a processor 702, a display 704, such as a monitor; a network interface 708, such as a Local Area Network LAN, a wireless 802.11x LAN, a 3G mobile WAN or a WiMax WAN; and a computer-readable medium 710. Each of these components may be operatively coupled to a bus 712. For example, the bus 712 may be an EISA, a PCI, a USB, a FireWire, a NuBus, or a PDS.

The computer-readable medium 710 may be any suitable medium that participates in providing instructions to the processor 702 for execution. For example, the computer-readable medium 710 may be non-volatile media, such as an optical or a magnetic disk; volatile media, such as memory. The computer-readable medium 710 may also store a table processing machine readable instructions 714, which may perform the methods 300 and/or 600 and may include the modules 210-224 of the control apparatus 200 depicted in FIG. 2. In this regard, the machine readable instructions 714 may include a data access module 210, a secondary material ejection device control module 212, a build material distributor control module 214, a coalescing agent ejection device control module 216, a coalesce modifier agent ejection device control module 218, an energy source control module 220, a carriage control module 222, and a build area platform control module 224.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus for generating a three-dimensional object, said apparatus comprising:
a build area platform;
a build material distributor to distribute a build material;
a secondary material ejection device to eject a secondary material;
a coalescing agent ejection device to eject a coalescing agent; and
a controller configured to:
control the secondary material ejection device to eject the secondary material in a predefined pattern on the build area platform,
control the build material distributor to distribute a layer of the build material around and on top of the ejected secondary material on the build area platform, and scrape a top portion of the layer of the build material to cause the ejected secondary material to be exposed and to cause the layer of the build material to have substantially a same height as the ejected secondary material,
control the coalescing agent ejection device to eject the coalescing agent onto the layer of the build material, and
control an energy source to apply energy onto the ejected coalescing agent to cause the build material in contact with the ejected coalescing agent to coalesce and solidify.

2. The apparatus according to claim 1, wherein the secondary material comprises an electrically conductive material.

3. The apparatus according to claim 2, wherein the electrically conductive material is an electrically conductive powder,
wherein the controller is further configured to control the coalescing agent ejection device to eject the coalescing agent onto the electrically conductive powder and control the energy source to apply energy onto the electrically conductive powder and the coalescing agent to melt and fuse particles of the electrically conductive powder together, and
wherein the electrically conductive powder has a melting point that within about 20° C. of a melting point of the build material.

4. The apparatus according to claim 1, wherein the controller is further configured to, prior to controlling the secondary material ejection device to eject the secondary material:
control the build material distributor to form a sub-layer of the build material on the build area platform;
control the coalescing agent ejection device to eject the coalescing agent on the sub-layer of the build material;
control the energy source to apply energy on the ejected coalescing agent and the sub-layer of the build material to cause a portion of the build material that is in contact with the ejected coalescing agent to coalesce and solidify; and
wherein the controller is configured to control the secondary material ejection device to eject the secondary material onto the solidified portion of the build material.

5. The apparatus according to claim 1, further comprising:
a movable carriage that is movable with respect to the build area platform, wherein the coalescing agent ejection device is mounted on the movable carriage.

6. The apparatus according to claim 5, wherein the controller is configured to control the coalescing agent ejection device to eject the coalescing agent onto the ejected secondary material and
wherein the energy source is mounted on the movable carriage and is to also apply energy to the ejected secondary material and the coalescing agent on the ejected secondary material to cause particles in the ejected secondary material to melt and fuse together.

7. The apparatus according to claim 1, further comprising:
a coalescence modifier agent ejection device to eject a coalescence modifier agent; and
wherein the controller is further configured to control the coalescence modifier agent ejection device to selectively eject the coalescence modifier agent on selected areas of the build material.

8. The apparatus according to claim 1, further comprising:
an actuator to move one of the build area platform and the secondary material ejection device with respect to the other one of the build area platform and the secondary material ejection device such that a spacing between the build area platform and the secondary material ejection device is changed to enable multiple layers of the three-dimensional object to be formed.

9. An apparatus for generating a three-dimensional object, said apparatus comprising:
a build area platform;
a build material distributor to distribute a build material;
an electrically conductive material ejection device to eject an electrically conductive material;
a coalescing agent ejection device to eject a coalescing agent;
an energy source; and
a controller configured to:
control the electrically conductive material ejection device to eject the electrically conductive material into a pattern on the build area platform,
control the build material distributor to distribute a layer of the build material around and on top of the ejected electrically conductive material on the build area platform, and scrape a top portion of the layer of the build material to cause the ejected electrically conductive material to be exposed and to cause the layer of the build material to have substantially a same height as the ejected electrically conductive material,
control the coalescing agent ejection device to eject the coalescing agent onto the layer of the build material and the ejected electrically conductive material, and
control the energy source to apply energy onto the ejected electrically conductive material to melt and fuse the ejected electrically conductive material into a conductive trace pattern and onto the layer of the build material in contact with the ejected coalescing agent to coalesce and solidify.

10. The apparatus according to claim 9, further comprising:
a coalescence modifier agent ejection device to eject a coalescence modifier agent; and
wherein the controller is further configured to control the coalescence modifier agent ejection device to selectively eject the coalescence modifier agent on selected areas of the build material.

11. The apparatus according to claim 9, wherein, to eject the coalescing agent onto the layer of the build material, the controller is configured to control the coalescing agent ejection device to eject the coalescing agent onto sections of the layer of the build material that are adjacent to the ejected electrically conductive material and prevent the coalescing agent from being deposited onto the ejected electrically conductive material.

12. The apparatus according to claim 9, wherein the build material distributor includes a rotating roller to roll over the layer of the build material to scrape the top portion of the layer of the build material.

13. The apparatus according to claim 1, wherein, to eject the coalescing agent onto the layer of the build material, the controller is configured to control the coalescing agent ejection device to eject the coalescing agent onto sections of the layer of the build material that are adjacent to the ejected secondary material and prevent the coalescing agent from being deposited onto the ejected secondary material.

14. The apparatus according to claim 1, wherein the build material distributor includes a rotating roller to roll over the layer of the build material to scrape the top portion of the layer of the build material.

\* \* \* \* \*